Oct. 16, 1945.  W. J. TROTT  2,386,992
AUDIBLE STALL INDICATOR
Filed Dec. 7, 1942
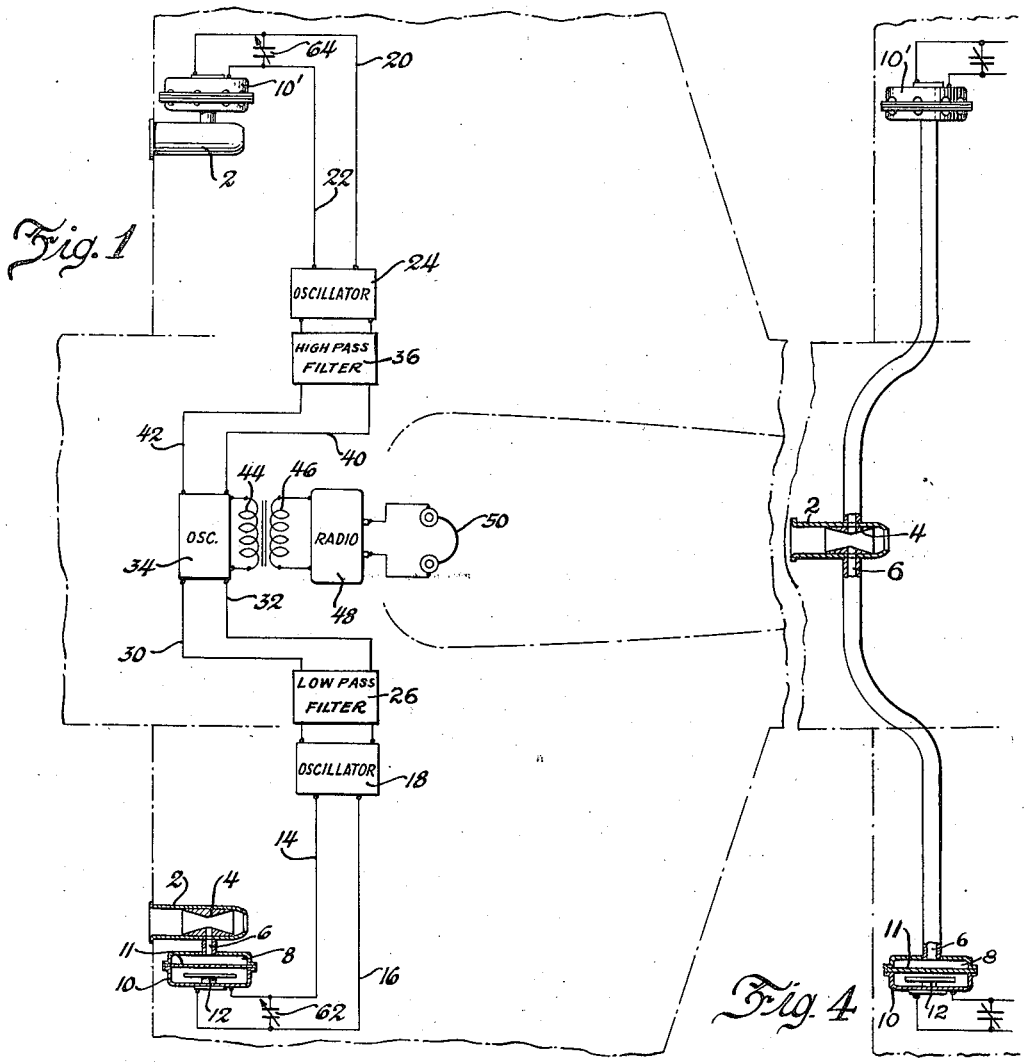
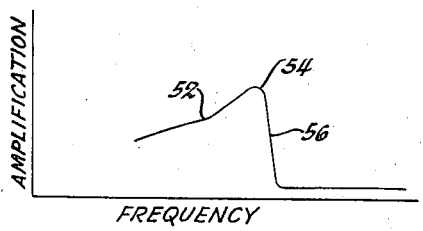
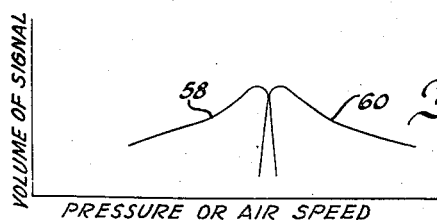
Inventor
Winfield James Trott
By
Blackmor, Spencer & Flint
Attorneys

UNITED STATES PATENT OFFICE 2,386,992

AUDIBLE STALL INDICATOR

Winfield James Trott, Detroit, Mich., assignor to General Motors Corporation, Detroit, Mich., a corporation of Delaware Application December 7, 1942, Serial No. 468,087

8 Claims. (Cl. 177—311)

This invention relates to indicating or signaling means and more particularly to audible means for indicating or signaling a critical speed, such as, for example, the stall speed of aircraft. It may, however, be utilized to indicate any critical speed of a moving object. In the operation of aircraft there are two factors which determine whether there is sufficient upward force upon the wings or "lift" being applied to maintain the plane in the air. These factors are (1) the angle of incidence or climb and (2) the speed of the plane, both of which affect the upward force on the wings. If for any reason this force becomes insufficient to maintain the plane in the air it will descend or "stall." In coming in for a landing, for example, the pilot is often not aware that he is approaching this critical point until the craft has stalled and begun to lose altitude. There are of course numerous other incidents of flight that may result in the craft approaching the critical speed without the knowledge of the pilot, such as, for example, attempting to obtain the maximum rate of climb.

It is therefore an object of my invention to provide means for indicating a critical air speed.

It is a further object of my invention to provide means for indicating the stall speed of aircraft.

It is a still further object of my invention to provide an audible stall speed indicator for aircraft.

It is a still further object of my invention to provide a signal for stall speed that may be applied to existing equipment in the craft for amplification and conversion into sound waves.

With these and other objects in view which will become apparent as the specification proceeds, the embodiments of my invention will be best understood by reference to the following specification and claims, and the illustrations in the accompanying drawing, in which:

Figure 1 is a schematic circuit diagram of the system of my invention;

Figure 2 is a graph showing the response curve of amplification plotted against frequency of one of the signals;

Figure 3 is a graph showing the two superimposed signals from the two variable systems; and Figure 4 is a schematic showing of a modified form of my invention utilizing only one central Pitot Venturi tube.

Referring now more specifically to the drawing, there is shown in Figure 1 a dotted outline of the body of a plane. Mounted on each wing is a Pitot tube 2 having a Venturi section 4 which is connected by passage 6 with a hollow cavity 8 in a circular casing 10 formed of two sections having a diaphragm 11 mounted between them. Within the chamber on the opposite side of the diaphragm is a circular disc 12 which is electrically insulated from the casing. Thus the disc 12 and the diaphragm 11, which are both formed of conductive material, form a condenser. Line 14 is connected to the casing and forms a terminal for the diaphragm 11 and line 16 is connected to the spaced disc 12. Thus as the speed of the craft varies, the pressure within the venturi 4 will vary, which pressure is transmitted through the passage 6 to one side of the diaphragm 11 which in turn assumes different positions within the casing 10, dependent upon the pressure applied to one face thereof. This in turn varies the position of the diaphragm with respect to the disc 12 and therefore varies the capacity of the condenser formed by these two parts.

This capacity is connected between lines 14 and 16 into an oscillating circuit shown diagrammatically in block 18. The Pitot tube construction on the opposite wing is exactly the same and in that instance the variable condenser used in casing 10' is connected through lines 20 and 22 to an oscillatory system 24. While two Pitot tubes have been shown mounted on the wings, a single tube may be used mounted on the fuselage and connected by suitable ducts to the two signal oscillators as shown in Figure 4. The output of the oscillator 18 is connected to a low pass filter 26 which may include a transformer if increased voltage is desired, which is in turn connected by lines 30 and 32 to a third fixed oscillator 34. Likewise, the output of oscillator 24 is connected to a high pass filter 36 which is connected by lines 40 and 42 to the oscillator 34. The output of the combined signals which are mixed in oscillator 34 is applied to the primary 44 of a transformer whose secondary 46 is connected to the audio amplifier of a radio receiver 48 and thus appears in the phones 50.

The two oscillators 18 and 24 are high frequency oscillators, the outputs of which beat against the output of oscillator 34 which is of constant frequency. They are so designed that as the capacity provided by disc 12 and diaphragm 11 in the tuned circuit varies due to alteration in speed of the craft, their frequencies will vary in opposite directions; that is, as the air speed increases, and therefore the pressure in the Pitot tubes increases, the frequency in one oscillator will increase and that in the other oscillator will decrease. Furthermore, the coupling circuits which couple these two variable oscillators into the constant oscillator are so designed as to give a sloped response curve and a maximum of amplification at a frequency which is produced at approximately the stall or critical speed of the craft and a rapid cutoff. Thus the output of the signal fed into the oscillator 34 from oscillator 18 and filter 26 is that shown in Figure 2. It will be noted therein that as the speed of the craft increases, the frequency of the oscillator 18 will increase as shown by curve 52, and the amplification or amplitude of the system including the transformer 26—28 will increase to a certain peak 54 following which it will descend very rapidly as shown by the curve portion 56 to a very low value and remain there. At this time the other pick-up and oscillator system 24 which has had a very low value will suddenly increase to a peak and then gradually die away.

These two crossed curves are shown in Figure 3 and are plotted as volume of signal against air speed. The curve to the left as shown at 58 is that from the oscillator 18 and the curve to the right indicated at 60 is that provided by the oscillator 24 and its associated filter. Thus the signal applied to the receivers will be a steady hum of a frequency dependent upon the air speed which, let us assume for the moment, is somewhere on the curve 60. If now the speed of the craft decreases, the volume of the signal will increase as will its frequency until it reaches a peak point and any further decrease will suddenly substantially eliminate that signal and apply another frequency presumably of much lower value so that there is a definite tone change in the receiver, which frequency and tone will be due to the oscillator 18. Any further decrease in speed will of course decrease both the frequency and the volume of the lower pitched signal. Thus by sudden changes of sound in the receiver between two different audible pitches the operator of the plane will be informed that he has passed the critical or stall speed of the craft. The signal will go suddenly from a high to a low pitch.

Not only does the operator hear a sudden change in pitch of the signal as he passes through the critical speed, but he also hears an increase in the signal strength of the particular signal which is audible as the plane approaches the critical speed so that he is informed that the stall point is being reached and in cases of landing he can increase the speed so that it will not drop below the stall speed until desired. This will all be a background to the normal radio signals being received by the craft's radio and will not interfere with the radio reception.

If the speed of the craft is increasing of course the opposite will be true; that is, that the tone volume will increase and then will change suddenly from a low to a high pitch indicating that the plane has attained sufficient velocity to maintain it in the air. The peaked response wave is due to the response or energy transfer of the filter at different frequencies and they may be so designed as to give a desired peaked response curve. The peak point may be adjusted or varied along the frequency base or air speed base by applying a variable condenser such as 62 or 64 in parallel with the two condensers formed of the diaphragms and the discs and by varying these parallel condensers the peak or stall point indication may be moved along the base to the desired position to correspond to the stall speed of the particular craft. It will thus be evident that I have provided a means for indicating a critical speed of movable objects which requires no continued adjustment and which gives an audible signal which will impress itself upon the operator of the craft at each instant that this point is approached or passed, either increasing or decreasing in speed, but which will not interfere with his normal craft operations or detract his attention in any manner.

I claim:

1. In a signaling system, a movable body, a pair of tunable oscillators mounted thereon, spaced means responsive to body speed to cause tuning of said oscillators in inverse relation, a third constant frequency oscillator, a plurality of means interconnecting each of the tunable oscillators with the fixed frequency oscillator, said interconnecting means having adjacently peaked response characteristics.

2. In a signaling system, a movable body, a pair of tunable oscillators mounted thereon, spaced means responsive to body speed to cause tuning of said oscillators in inverse relation, a third constant frequency oscillator, a plurality of means interconnecting each of the tunable oscillators with the fixed frequency oscillator, said interconnecting means having unequal response characteristics, said connecting means for interconnecting one tunable oscillator with the fixed oscillator having different response characteristics from the means interconnecting the other tunable oscillator with the fixed one said response characteristics being adjacently peaked.

3. In a signaling system, a movable body, a pair of tunable oscillators mounted on the body, means responsive to body speed to tune the oscillators in inverse relation whereby as the speed of the body changes the frequency of one oscillator will increase and the other will decrease, audible means connected to both oscillators and coupling means between each oscillator and the audible means having slightly displaced peaked response curves whereby the amplitude of each sound will be louder at certain predetermined speeds than at others.

4. In a signaling system, a movable body, a pair of tunable oscillators mounted on the body, means responsive to body speed to inversely tune the oscillators whereby as the speed of the body changes the frequency of one oscillator will increase and the other will decrease, a constant frequency oscillator connected to both tunable oscillators, coupling means between each tuned oscillator and the fixed oscillator having response characteristics that are sloped in opposite directions to a peak and displaced along the frequency axis, and audible signal means connected to the fixed oscillator.

5. In a signaling system, a movable body, a pair of tunable oscillators to generate different frequencies, means responsive to pressure created by body speed to vary capacity in the tuned oscillators and thus alter the tuning as the speed changes, said tuning being in inverse relation in the two oscillators, a common fixed oscillator connected to both the tunable oscillators, a filter connected between each tunable oscillator and the fixed oscillator, said filters having peaked response curves over the frequency range, said peaks lying at different points in the band and audible signal means connected to the output of the fixed oscillator.

6. In a signaling system, a movable body, a pair of tunable oscillators to generate different frequencies, means responsive to pressure created by body speed to vary capacity in the tuned oscillators and thus alter the tuning as the speed changes, said tuning being in inverse relation in the two oscillators, a common fixed oscillator connected to both the tunable oscillators, a filter connected between each tunable oscillator and the fixed oscillator, said filters having peaked response curves over the frequency range, said peaks being only slightly displaced and said response tapering gradually to the peak on opposite band sides and having sharp cut off on the adjacent side whereby one signal will rapidly replace the other on change of speed.

7. In a signaling system, a movable body, a pair of tunable oscillators mounted thereon, means responsive to the speed of the body to tune the oscillators in inverse relation, a constant frequency oscillator, coupling means for connecting each tunable oscillator to the constant frequency oscillator, a high pass filter in one coupling means and a low pass filter in the other, the response curves of the two filter means having adjacent but spaced peaks.

8. In a signaling system, a movable body, a pair of tunable oscillators mounted thereon, spaced means responsive to body speed to cause tuning of said oscillators in inverse relation, a constant frequency oscillator and coupling means between each tunable oscillator and the constant frequency oscillator having a filter means, said filter means for the respective couplings so designed as to pass closely adjacent portions of the frequency band.

W. JAMES TROTT.